US008045317B2

(12) United States Patent
Easwaran et al.

(10) Patent No.: US 8,045,317 B2
(45) Date of Patent: Oct. 25, 2011

(54) CURRENT LIMITED VOLTAGE SOURCE WITH WIDE INPUT CURRENT RANGE

(75) Inventors: Sri N. Easwaran, Freising (DE); Ingo Hehemann, Hagen a.T.W. (DE)

(73) Assignee: Texas Instruments Incorporated, Dallas, TX (US)

( * ) Notice: Subject to any disclaimer, the term of this patent is extended or adjusted under 35 U.S.C. 154(b) by 484 days.

(21) Appl. No.: 12/370,157

(22) Filed: Feb. 12, 2009

(65) Prior Publication Data
US 2009/0206811 A1    Aug. 20, 2009

Related U.S. Application Data

(60) Provisional application No. 61/141,880, filed on Dec. 31, 2008.

(30) Foreign Application Priority Data

Feb. 13, 2008  (DE) .......................... 10 2008 008 831

(51) Int. Cl.
*F23Q 5/00*    (2006.01)
(52) U.S. Cl. ...................... 361/247; 307/10.01; 327/411
(58) Field of Classification Search ............. 363/17–20, 363/26, 97, 98; 323/274, 277, 266, 282, 323/287, 351; 361/18, 111, 93.9, 98, 247; 307/113, 115, 65, 241, 465; 327/108–112, 327/170, 436, 566, 411; 710/10
See application file for complete search history.

(56) References Cited

U.S. PATENT DOCUMENTS
4,626,831 A * 12/1986 Engel .......................... 340/500
(Continued)

FOREIGN PATENT DOCUMENTS
DE    3941606    6/1991
DE    69613956    7/2001
EP    1769974    4/2007

OTHER PUBLICATIONS

"Universal Constant-g, Input-Stage Architectures for Low-Voltage Op Amps," IEEE Transactions on Circuits and Systems-I: Fltndamental Theory and Applications, vol. 42, No. 11, Nov. 1995, pp. 886-895 (Changku Hwang, ALi Motamed, and Mohammed Ismail).

*Primary Examiner* — Rajnikant Patel
(74) *Attorney, Agent, or Firm* — John J. Patti; Wade J. Brady, III; Frederick J. Telecky, Jr.

(57) ABSTRACT

An integrated electronic device includes circuitry for providing a regulated output supply voltage level at an output node from an adjustable current. The circuitry includes an adjustable current source for providing the adjustable current and for adjusting the adjustable current to a magnitude of a target value in response to a configuration signal, an auxiliary adjustable current source providing an auxiliary adjustable current having a magnitude corresponding to the target value, and an output supply voltage level regulating loop coupled to the output node and adapted to keep the output supply voltage level at a preset value. A current selecting stage is adapted to receive the adjustable current and the auxiliary current. The current selecting stage is further adapted to supply a selected current corresponding to a lesser value of the adjustable current and the auxiliary adjustable current. Further, a current limiting stage is coupled to the output node for limiting the selected current to a predefined magnitude.

19 Claims, 11 Drawing Sheets

U.S. PATENT DOCUMENTS

| | | | |
|---|---|---|---|
| 4,860,154 A * | 8/1989 | Fazlollahi | 361/101 |
| 5,175,484 A * | 12/1992 | Witehira et al. | 320/125 |
| 5,563,526 A * | 10/1996 | Hastings et al. | 326/37 |
| 7,064,532 B1 * | 6/2006 | Suzuki | 323/276 |
| 7,142,407 B2 | 11/2006 | Sibrai | |
| 7,154,733 B2 | 12/2006 | Sibrai | |
| 2005/0225924 A1 | 10/2005 | Sibrai | |
| 2006/0066405 A1 | 3/2006 | Benelbar | |

* cited by examiner

CURRENT LIMITED VOLTAGE SOURCE WITH WIDE INPUT CURRENT RANGE

CROSS-REFERENCE TO RELATED APPLICATIONS

This application claims priority to German Patent Application Ser. No. 102008008831.5, entitled "Current Limited Voltage Source with Wide Input Current Range," filed on Feb. 13, 2008, which is hereby incorporated by reference for all purposes.

TECHNICAL FIELD

The invention relates generally to electronics and, more particularly, to current limited voltage sources with wide input current ranges.

BACKGROUND

Adjustable current sources are used in a variety of applications. An example of one application is the use in squib drives for automotive airbags. A reason for using the adjustable current source is the variable resistance of the squib and other application specific requirements. However, the adjustable current flowing through the squib is also used to generate a supply voltage for other electronic circuits. A simplified circuit diagram of a typical application of an adjustable current driver is shown in FIG. 1.

Referring to FIG. 1, the reference numeral 100 generally designates the conventional system. In this illustrative example, the magnitude of the adjustable current $I_{ADJ}$ can be varied between three different target values I1, I2, and I3. The target values may range from 10 mA to 100 mA due to production spread of the resistance of squib Rx and other requirements of the application. In this example, the resistance of squib Rx may, for example, vary between about 1Ω and about 6Ω. The adjustable current source 102 is typically controlled by a digital control signal CNTL0. After the current $I_{ADJ}$ has passed through the squib Rx, it is used to generate a substantially constant output supply voltage $V_{OUT}$ at the output node or pin 114. Output voltage $V_{OUT}$ is used as a voltage supply for diagnostic circuitry 108, which can determine, for example, the state of the squib Rx and other components. Output voltage $V_{OUT}$ can also be used to supply further signal processing circuitry 112. In order to maintain the output voltage $V_{OUT}$ at a rather constant level, a Zener diode Dz is used that should provide a desired voltage level for the output voltage $V_{OUT}$.

One problem with the system 100 is that the pins 104 and 106 can be shorted to a supply voltage level. A short circuit between pins 104 and 106 can result in large currents flowing into circuit 100, potentially damaging or destroying various circuits. Therefore, a current limiter 110 is provided to limit the amount of current that can pass through the Zener diode Dz and flow into the circuit 116. In a typical application, the current is limited to twice the target value (i.e., for a target value of 10 mA, the current limit is set to 20 mA and for a target value of 100 mA, the limit will be set to 200 mA). However, a Zener diode Dz, which is integrated on a semiconductor device, occupies a substantial amount chip area in order to be able to withstand currents as high as several milliamps. Additionally, if a current exceeds the current limit, the output voltage $V_{OUT}$ at pin 114 would rise regardless of the breakdown voltage of the Zener diode.

Some other examples of conventional systems are European Patent No. EP1769974; U.S. Pat. No. 7,142,407; U.S. Pat. No. 7,154,733; and U.S. Patent Pre-Grant Publ. No, 2005/0225924.

SUMMARY

Accordingly, an integrated electronic device is generally provided which includes an adjustable current source for providing an adjustable current and for adjusting the magnitude of the adjustable current to a target value in response to a configuration signal. The circuitry generally comprises an auxiliary adjustable current source, which provides an auxiliary adjustable current, which has a magnitude that corresponds to the target value. There can also be a current selecting stage, which is generally adapted to receive the adjustable current and the auxiliary adjustable current and to supply a selected current corresponding to a lesser value of the adjustable current and the auxiliary adjustable current. The circuitry comprises an output supply voltage level regulating loop coupled to the output node. The output supply voltage level regulating loop is generally adapted to keep the output supply voltage level at a preset value. Further, there can be a current limiting stage for limiting the selected current to a predefined magnitude. The current from the adjustable current source can be used, for example, to drive an adjustable current through a squib. After being passed through the squib, the current flows back into the integrated semiconductor device and is generally used for generating the supply voltage. Within the integrated semiconductor device according to the present invention, the auxiliary adjustable current source provides a second current (i.e., the auxiliary adjustable current) which has basically the same magnitude as the received adjustable current should have. The two currents are passed through a current selection stage, which provides at its output only a current which corresponds to the lesser of the two currents (i.e., the lesser of the adjustable and the auxiliary adjustable current). The auxiliary adjustable current is generally an internal current of the integrated semiconductor device, whereas the adjustable current is generally passed outside the integrated semiconductor device and can therefore be subject to short circuits and so forth.

Therefore, in case of a short circuit between any pin of the device under diagnosis, the selected current which can then used to generate the output voltage will not exceed a predefined target value. Since the integrated electronic device in accordance with a preferred embodiment of the present invention generally does use a Zener diode, the respective chip area for the diode can be saved. Furthermore, the output voltage is generally much more stable, as the output voltage level, can be regulated by a dedicated loop.

There are many different ways of implementing the current selection stage. Generally, the minimum current selection stage must be capable to limit the magnitude of the selected current (i.e., the current output to the output node) to a value which is not generally greater than a predetermined value if the received adjustable current exceeds a certain magnitude due to any failure. An advantageous implementation may be based on the auxiliary adjustable current source which can be coupled to the current selecting stage. The auxiliary adjustable current source can be set to the same magnitude as the current limit. The current selecting stage can then be adapted to choose a current as the selected current which has the magnitude of the adjustable current and the auxiliary adjustable current. In order to adjust the adjustable current source, the same control signals can be used as for the auxiliary adjustable current source.

The current selecting stage can adapted to output a selected current of a magnitude being the magnitude of a first current and a second current. The current selecting stage generally comprises a first current difference node adapted to provide a difference current of the first current minus the second current. There can also be a second current difference node adapted to provide the selected current by building the difference of the first current minus the difference current. Furthermore, there can be a current mirror coupled between the first difference node and the second difference node for supplying the difference current to the second difference node. The current mirror is generally adapted such that the current output from the current mirror to the second difference node becomes substantially zero when the second current is greater than the first current. This advantageous effect is provided by the current mirror as there is a diode coupled transistors in the current mirror, which prevents current from flowing in both directions. Accordingly, the current selecting stage can smoothly switch its output current (i.e., the selected current) between the first current and the second current, either of which has the smaller magnitude generally without producing spikes or unwanted noise in the circuit. There is generally no need to use comparators or high impedance nodes in the circuit in order to provide the necessary switching signals for switching the output current from one current (or magnitude) to another. The circuitry also can uses a current based comparison principle. Therefore, there is generally no need to translate currents into voltages, which typically requires comparators, high impedance nodes and large capacitors in order to smooth out transients or peaks due to switching. Furthermore, since no capacitors are required, chip area can be saved. In terms of the present invention, the first current is the adjustable current and the second current is the auxiliary adjustable current.

Additionally, the output supply voltage level regulating loop can includes an error amplifier and an output transistor coupled with a control gate to an output of the error amplifier. The error amplifier can then be adapted to compare the output supply voltage level with a reference voltage level. Further, the error amplifier provides a control voltage to the output transistor, which can be based on the comparison result. The control loop generally keeps the output voltage at the output node constant.

In the previous configuration of the output supply voltage level regulation loop, the output transistor can preferably be implemented such that its physical dimensions (i.e. the width to length ratio or W/L ratio) are adjustable in response to the selected target magnitude of the current. This allows the integrated electronic device to be more appropriately adapted to different target magnitudes of the adjustable current.

Furthermore, in the above configuration of the voltage regulation loop, an error amplifier can be used, which can advantageously be based on a Miller compensation. This allows different values of a load capacitance to be compensated so as to provide a stable design over a wide range of capacitive loads. This takes account of the varying capacitive loads that may be coupled to the output node in a specific application and the stability of closed loop control architectures.

In accordance with a preferred embodiment of the present invention, an apparatus is provided. The apparatus comprises a first pin that is adapted to be coupled to a load; a second pin that is adapted to be coupled to the load; a third pin; a first current source that is coupled to the first pin, wherein the first current source is adjustable, and wherein the first current source provides a first current to the first pin; a second current source that is adjustable and that provides a second current; a selector that is coupled to the second pin, the second current source, and the third pin, wherein the selector is adapted to receive the first current from the second pin and to receive the second current from the second current source, and wherein the selector outputs the lesser of the first and second currents to the third pin; a voltage regulator that is coupled to the third pin; and a current limiter that is coupled to the voltage regulator.

In accordance with a preferred embodiment of the present invention, the voltage regulator further comprises an error amplifier having a first input, a second input, and an output, wherein the first input is coupled to the third pin and the selector, and wherein the error amplifier receives a reference voltage at its second input; and a transistor that is coupled to the output of the error amplifier at its control electrode, the third pin at one of its passive electrodes, and the current limiter at one of its passive electrodes.

In accordance with a preferred embodiment of the present invention, the error amplifier further comprises a first amplifier that is coupled to the third pin and that receives the reference voltage; a second amplifier that is coupled between the first amplifier and the control electrode of the transistor; and a third amplifier that is coupled between the third pin and the control electrode of the transistor.

In accordance with a preferred embodiment of the present invention, the transistor further comprises a plurality of transistors, wherein each transistor is coupled to the output of the error amplifier at its control electrode and the third pin at one of its passive electrodes; and a plurality of switches, wherein each switch is coupled between at least one of the transistors and the current limiter, and wherein each electrode is actuated by a control signal.

In accordance with a preferred embodiment of the present invention, the current limiter further comprises a third current source that provides a reference current; and a first transistor that is diode connected and that is coupled to the third current source; and a second transistor that is coupled to the voltage regulator at one of its passive electrodes and that is coupled to the control electrode of the first transistor at its control electrode.

In accordance with a preferred embodiment of the present invention, the second current source further comprises a third transistor that is coupled to the control electrode of the first transistor at its control electrode; a first switch that is coupled to between a passive electrode of the third transistor and the selector, wherein the first switch is actuated by a control signal; a fourth transistor that is coupled to the control electrode of the first transistor at its control electrode; a second switch that is coupled to between a passive electrode of the fourth transistor and the selector, wherein the second switch is actuated by a control signal; a fifth transistor that is coupled to the control electrode of the first transistor at its control electrode; and a third switch that is coupled to between a passive electrode of the fifth transistor and the selector, wherein the third switch is actuated by a control signal.

In accordance with a preferred embodiment of the present invention, the first current source further comprises a plurality of first current sources; and a plurality of switches, wherein each switch is coupled between at least one of the first current sources and the first pin, and wherein each switch is actuated by a control signal.

In accordance with a preferred embodiment of the present invention, the apparatus further comprises diagnostic circuitry that is coupled to the third pin.

In accordance with a preferred embodiment of the present invention, an apparatus is provided. The apparatus comprises a first pin that is adapted to be coupled to a load; a second pin that is adapted to be coupled to the load; a third pin; an adjustable current source that provides a first current to the first pin, wherein the adjustable current source includes a plurality of first current sources; and a plurality of first switches, wherein each switch is coupled between the first pin and at least one of the first current sources, and wherein each switch is actuated by a first control signal; an auxiliary current source that provides a second current, wherein the auxiliary current source includes a reference current source; a first transistor that is diode-connected and that is coupled to the reference current source at one of its passive electrodes; a plurality of second transistors, wherein each second transistor is coupled to the control electrode of the first transistor at its control electrode; and a plurality of second switches, wherein each second switch is coupled to a passive electrode of at least one of the second transistors, and wherein each second switch is actuated by a second control signal; a selector that is coupled to the second pin, the auxiliary current source, and the third pin, wherein the selector is adapted to receive the first current from the second pin and to receive the second current from the auxiliary current source, and wherein the selector outputs the lesser of the first and second currents to the third pin; a voltage regulator that is coupled to the second pin; and a current limiter including; the reference current source; the first transistor; a plurality of third transistors, wherein each third transistor is coupled to the control electrode of the first transistor at its control electrode; and a plurality of third switches, wherein each third switch is coupled between a passive electrode of at least one of the third transistors and the voltage regulator, and wherein each third switch is actuated by a third control signal.

In accordance with a preferred embodiment of the present invention, an apparatus is provided. The apparatus comprises a first pin that is adapted to be coupled to a load and that provides a first current; a second pin; a current source that is adjustable and that provides a second current; a selector that is coupled to the first pin, the current source, and the second pin, wherein the selector outputs a selected current to the second pin, and wherein the selector includes a first current difference node that provides a difference current, wherein the difference current is the first current minus the second current; a second current difference node that provides the selected current, wherein the selected current is the first current minus the difference current; and a current mirror that is coupled between the first difference node and the second difference node, wherein the current mirror supplies the difference current to the second difference node, and wherein the current mirror is configured such that the difference current output to the second difference node becomes substantially zero when the second current is greater than the first current; a voltage regulator that is coupled to the second pin; and a current limiter that is coupled to the voltage regulator.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
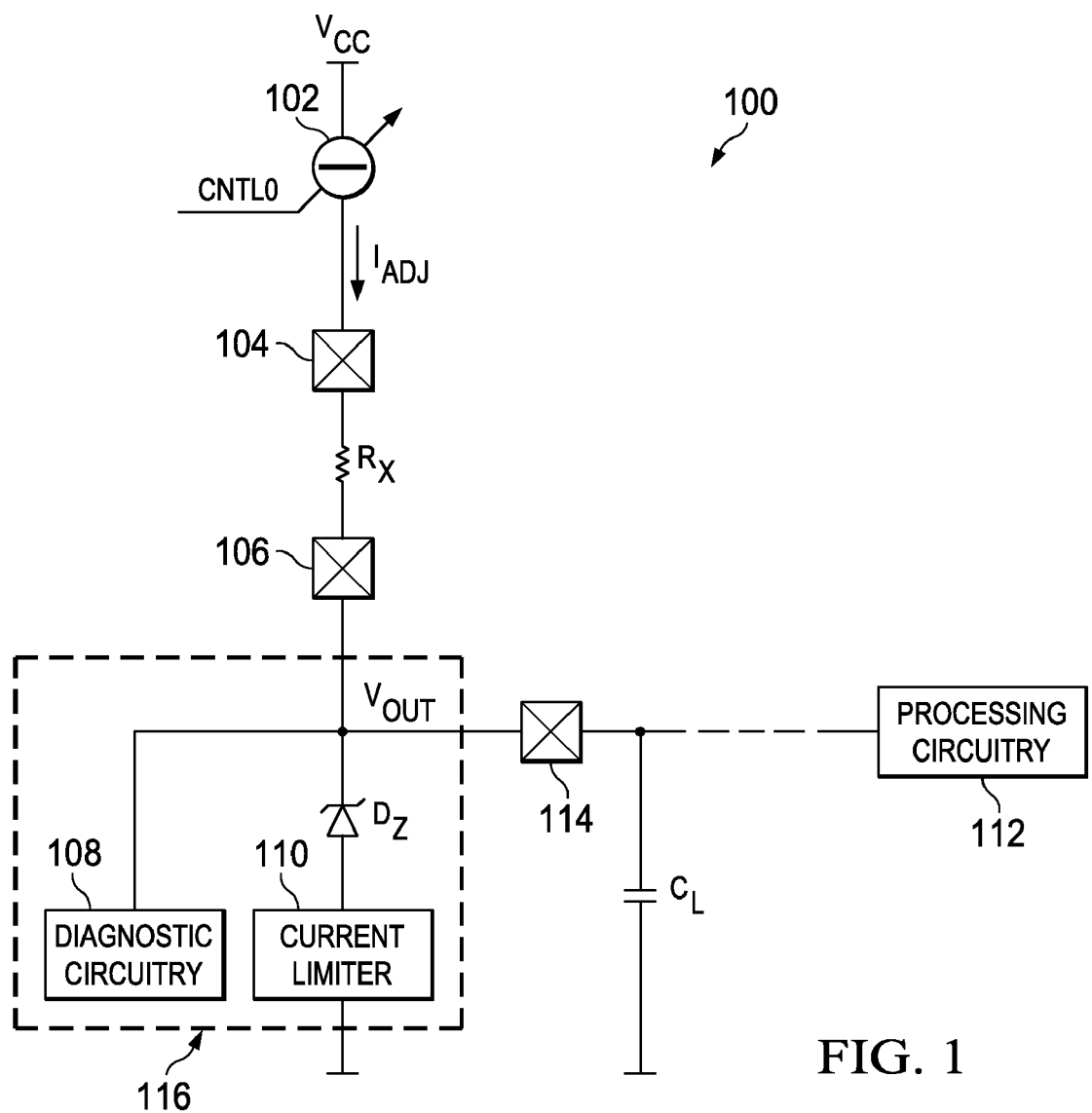
FIG. 1 is a simplified circuit diagram of conventional system.
Figure 2:
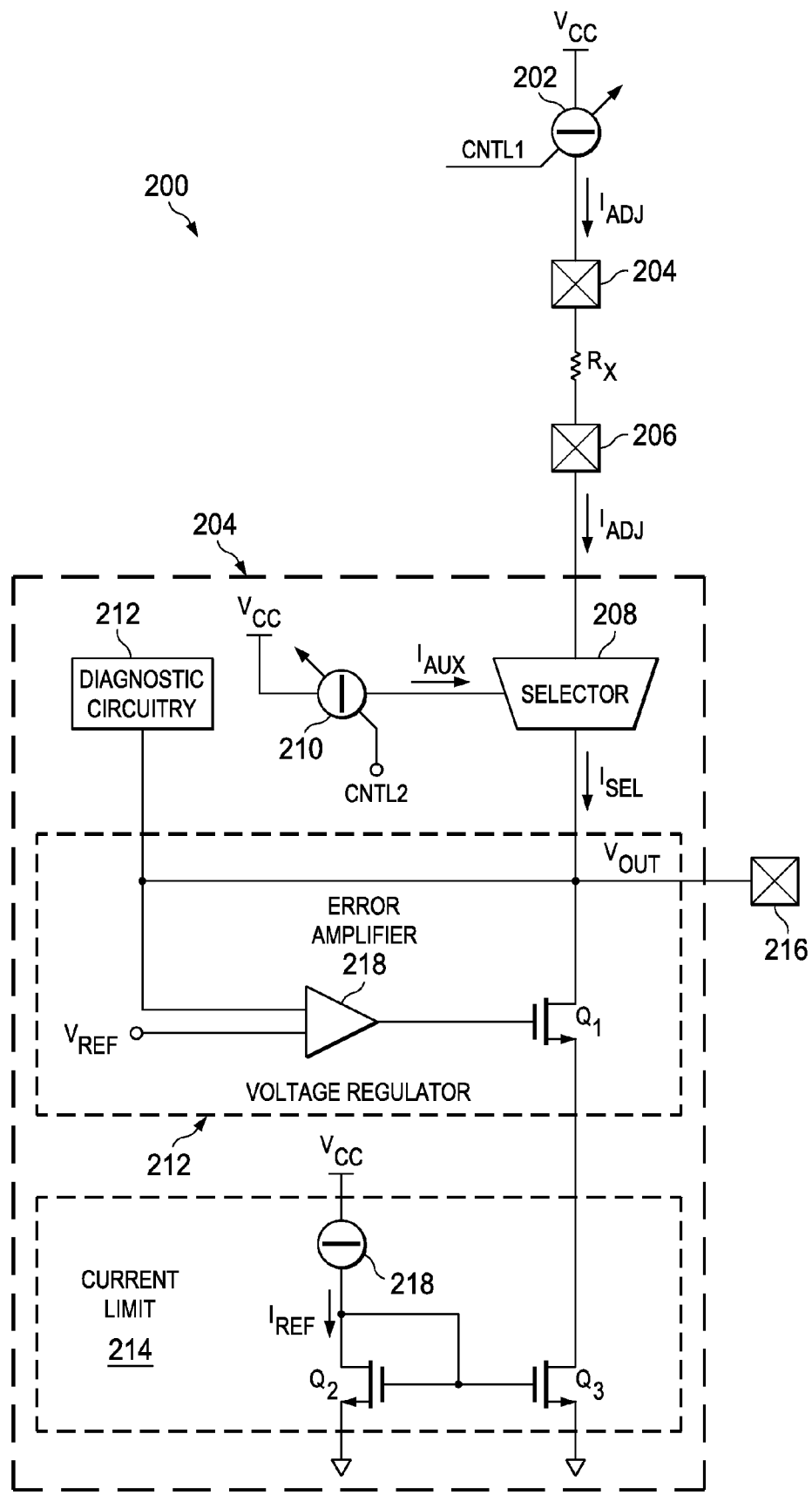
FIG. 2 is a simplified circuit of a system in accordance with a preferred embodiment of the present invention.

Refer now to the drawings wherein depicted elements are, for the sake of clarity, not necessarily shown to scale and wherein like or similar elements are designated by the same reference numeral through the several views.

Referring to FIG. 2-5 of the drawings, the reference numeral 200 generally depicts a system in accordance with a preferred embodiment of the present invention. The system 200 generally comprises an adjustable current source 202 and a circuit 204. Circuit 204 is preferably integrated onto an integrated circuit or IC, while current source 202 may be external. However, current source 202 is preferably integrated onto an IC with circuit 202.

Current source 202 is generally controlled by a digital control signal CNTL1 so as to provide an adjustable current $I_{ADJ}$. To accomplish this, current source 202 is generally comprised of current sources 502, 504, and 506 that can supply currents $I_1$, $I_2$, and $I_3$ and which are generally coupled to switches $S_1$, $S_2$, and $S_3$. Control signal CNTL1 actuates one or more of switches $S_1$, $S_2$, and $S_3$ to generate the current $I_{ADJ}$ with a target value of $I_1$, $I_2$, or $I_3$. The adjustable current IADJ flows through node or pin 204 device under diagnosis or load Rx, which is also generally coupled pin 206. The device under diagnosis Rx can be a squib of an airbag and may have a resistance value between about 1Ω and 6Ω due to production spread. The adjustable current $I_{ADJ}$ may be varied between 10 mA and 100 mA in order to compensate the varying resistances of device Rx, and for other application specific purposes related to diagnosis.

Circuit 204 is generally comprised of selector 208, auxiliary current source 210, diagnostic circuit 210, voltage regulator 212, and current limiter 214. Circuit 204 generally receives current $I_{ADJ}$ through pin 206 and operates to provide an output voltage $V_{OUT}$ at node or pin 218 by the use of the current $I_{ADJ}$.

Figure 5:
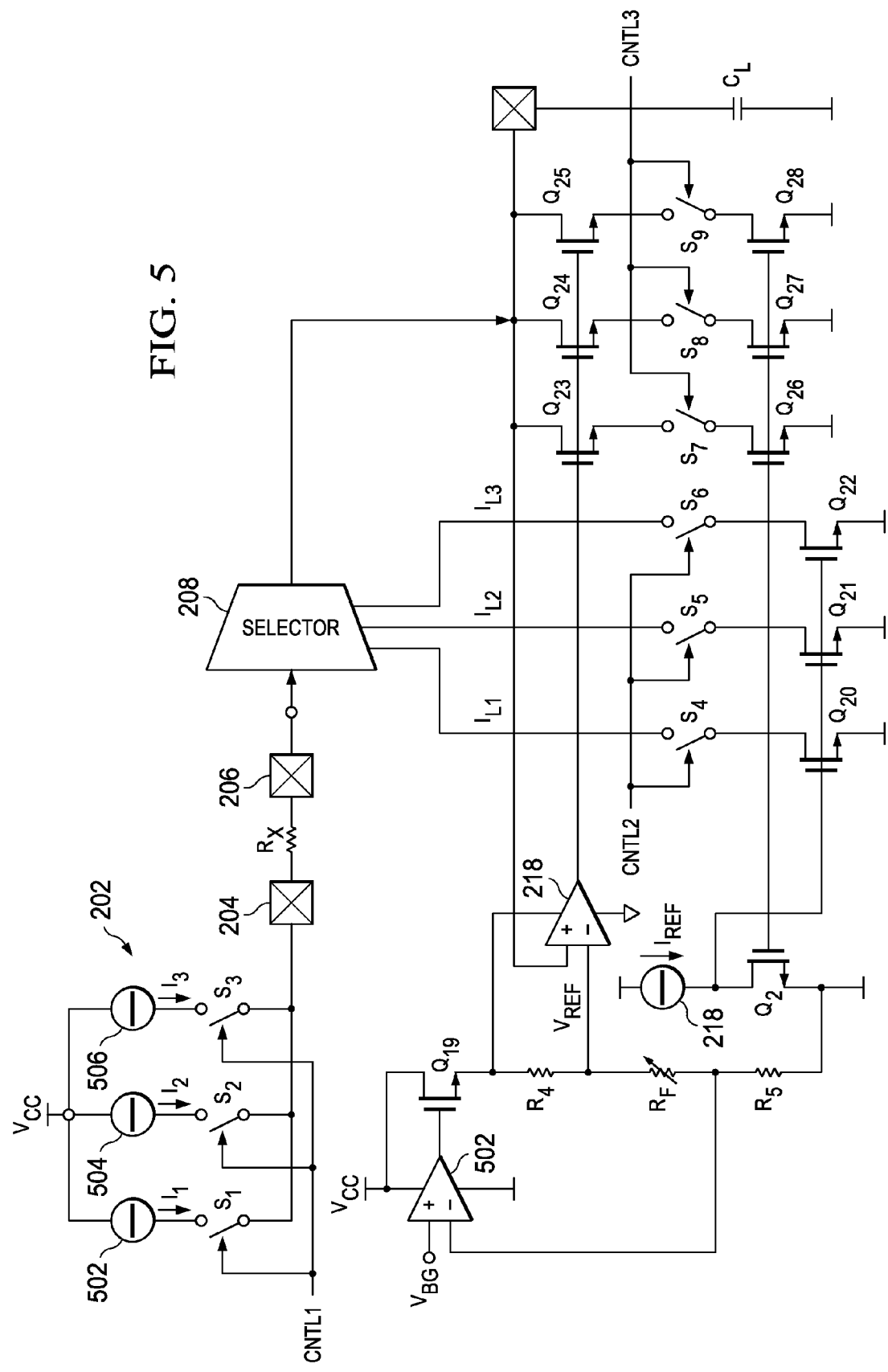
FIG. 5 is a simplified circuit diagram of the system of FIG. 2 in accordance with a preferred embodiment of the present invention.

In operation, the auxiliary current source 210 provides an auxiliary current $I_{AUX}$ with a target value, similar to that of current source 202. This current source 210 can be separate from other elements in circuit 204 or current source 202 (as shown in FIG. 1) or may share components within other elements in circuit 202 or current source 202 (as shown in FIG. 5). For example, current source 218 shares current source 218 and transistor $Q_2$ with current limiter 214 as shown in FIG. 5. In this example configuration, current source 218 provides a reference current $I_{REF}$ to transistor $Q_2$ (which is preferably a diode-connected NMOS FET). The control electrode (gate in an arrangement employing FETs) of transistor $Q_2$ is coupled to the control electrodes (gates in an arrangement employing FETs) to transistors $Q_{20}$ through $Q_{22}$ (which are preferably NMOS FETs) in current mirror configurations. Coupled to a passive electrode (drain in an arrangement employing FETs) of each of transistors $Q_{20}$ through $Q_{22}$ are switches $S_4$ through $S_6$ (respectively). These switches $S_4$ through $S_6$ are actuated by a control signal CNTL2 so as to provide one of currents $I_{L1}$ through $I_{L3}$ as a target value of the current $I_{AUX}$. Additionally, control CNTL1 and CNTL2 can be the same signal.

The selector 208 (which is generally coupled to pin 206, current source 210, and pin 216) generally provides a selection current $I_{SEL}$, which is the preferably lesser of an auxiliary current $I_{AUX}$ (generally provided by current source 210) and current $I_{ADJ}$. In an automotive application, for example, any external pin of the system 100 (such as pin 206) can be shorted to other electronic circuitry (e.g., a car battery) thereby causing a large current to flow into circuit 204. The current, which is supplied to the circuit 204, would then be the sum of the current $I_{ADJ}$ and an additional amount of current due to the short circuit. By employing the selector 208, the selection current $I_{SEL}$ would be the auxiliary current $I_{AUX}$ during the described short circuit because the magnitude of current $I_{AUX}$ is smaller.

To accomplish this, selector 208 is preferably comprised of transistors $Q_4$ through $Q_{11}$ (which are preferably PMOS FETs) transistors $Q_{12}$ through $Q_{18}$ (which are preferably NMOS FETs) that are arranged into a number of current mirrors. Current source 210 is generally coupled to a first current mirror (transistors $Q_7$ and $Q_6$) so that the current $I_{AUX}$ can be applied to difference node DN1. Current source 202 is generally coupled to two current mirror (transistors $Q_{12}$ through $Q_{14}$) so that current $I_{ADJ}$ can be applied to difference node DN1 and difference node DN2 through another current mirror (transistors $Q_4$ and $Q_5$). At difference node DN1, a difference current $I_{DIFF}$ is generated (which is current $I_{ADJ}$ minus current $I_{AUX}$). The difference current $I_{DIFF}$ is supplied to two current mirrors (transistors $Q_8$ and $Q_9$ and transistors $Q_{15}$ and $Q_{16}$) so as to apply the difference current $I_{DIFF}$ to the difference node DN2 so that the selection current $I_{SEL}$ output from the difference node is current $I_{ADJ}$ minus the difference current $I_{DIFF}$. However, because transistor Q8 is diode-connected, the difference current $I_{DIFF}$ is approximately zero when current $I_{AUX}$ is greater than current $I_{ADJ}$. Thus, the selection current $I_{SEL}$ output at the difference node DN2 is current $I_{ADJ}$ when current $I_{AUX}$ is greater than current $I_{ADJ}$ ($I_{SEL}=I_{ADJ}-0=I_{ADJ}$) of is current $I_{AUX}$ when current $I_{AUX}$ is less than current $I_{ADJ}$ ($I_{SEL}=I_{ADJ}-I_{DIFF}=I_{ADJ}-(I_{ADJ}-I_{AUX})=I_{AUX}$). The select current $I_{SEL}$ can then be supplied to other current mirrors (transistors $Q_{17}$, $Q_{18}$, $Q_{10}$, and $Q_{11}$). It is generally advantageous to use current mirrors as shown, as the currents through the different branches are basically independent from each other. However, in a simplified configuration it might be possible to use diode elements in the current paths in order to prevent currents from flowing in the opposite direction, thereby achieving a similar effect. Additionally, advantage of the selector 208 is that no comparators and no high impedance nodes are required in order to determine the respective conditions in order to switch from one current (e.g., $I_{ADJ}$) to the other (e.g., $I_{AUX}$) and vice versa. The switching to the respective smaller current occurs automatically and smoothly without the need for further sophisticated and area consuming components.

This selection current $I_{SEL}$ can then be applied to pin or node 216. A voltage regulator 212 is also generally coupled to the node 216 for regulating and stabilizing the output voltage level $V_{OUT}$. Voltage regulator 212 generally comprises an error amplifier 218 and a transistor $Q_1$ (preferably an NMOS FET). Error amplifier 218 can be an operational amplifier, in particular, an operational transconductance amplifier, which is shown in greater detail in FIG. 3. This error amplifier 218 generally includes two inputs and an output. The output of the error amplifier 218 is generally coupled to the control electrode of transistor $Q_1$ (gate in an arrangement employing FETs), while one input is coupled to node 216 and the other receives a reference voltage $V_{REF}$. In operation, the error amplifier 218 generally compares the output voltage $V_{OUT}$ with reference voltage $V_{REF}$ to provides a control signal to transistor $Q_1$, so as to open and close the channel of transistor $Q_1$ in response to the comparison result.

To perform as desired, the error amplifier 212 is generally comprised of three amplifiers 302, 304, and 306 that are arranged in stages. The first stage is generally comprised of amplifier 302 (which is preferably a transconductance operational amplifier with a gain of gm1, an output resistance of $R_1$ and an output capacitance of $C_1$) that receives the output voltage $V_{OUT}$ and reference voltage $V_{REF}$. The second stage is generally comprised of amplifier 304 (which is preferably a transconductance operational amplifier with a gain of gm2, an output resistance of $R_2$ and an output capacitance of $C_2$) that receives the output amplifier 302 and that outputs a signal to the control electrode of transistor $Q_1$. Additionally, capacitance $C_2$ generally represents the gate-source capacitance of transistor $Q_1$ which can be large because transistor $Q_1$ has a rather large aspect ratio (width to length ratio) in order to cope with large currents. A feedback connection is provided from node 216 to the control electrode of transistor $Q_1$, so as to provide Miller compensation (which is discussed below), with the Miller capacitance $C_3$ being dimensioned so as to compensate for different load capacitance values $C_L$. The Miller compensation moves the pole to higher frequencies beyond the unity gain bandwidth UGB (or transient frequency ft, which is the same as the UGB). This will be explained in more detail with respect to FIG. 4. The load capacitance can vary from, basically, zero to several hundred nF. The feedback path is generally comprised of amplifier 306 (which is preferably a transconductance operational amplifier with a gain of gm3 and an input impedance is $R_3$ that is generally equal to 1/gm3.

Further, the reference voltage $V_{REF}$ is generated in generally flexible and precise manner by use of a bandgap voltage $V_{BG}$ (a voltage generated by a bandgap voltage source), coupled to an amplifier 502. The amplifier 502 is generally coupled to transistor $Q_{19}$ (preferably an NMOS FET) and a resistive divider including resistors R4 and $R_5$ and programmable resistor $R_P$. This allows the reference voltage $V_{REF}$ to be determined very precisely and variably through the digitally programmable resistor $R_P$.

In conjunction with the voltage regulation provided by voltage regulator 212, a current limit 214 is also included to generally provide current limiting. Current limiter 214 is coupled to a passive electrode of transistor $Q_1$ (source in an arrangement employing FETs) for limiting the current through transistor $Q_1$ to a desired current level. Current limiter is generally comprised of a reference current source 218 and current mirror (transistors $Q_2$ and $Q_3$). Preferably, reference current source is coupled to and provides a reference current $I_{REF}$ to transistor $Q_2$ (which is preferably a diode-connected NMOS FET) and transistor $Q_3$ is coupled to transistor Q1. As the current through transistor $Q_1$ is already limited by the selector 208 to the magnitude of the selection current $I_{SEL}$, the current limiter 214 is an additional precautionary measure to generally prevent large currents.

Moreover, the output voltage $V_{OUT}$ can also be used to supply diagnostic circuitry 210 which are used to determine the state of the device under diagnosis Rx, as, for example, a squib. The capacitor $C_L$ represents the capacitive load, coupled to the output node 216. This capacitive load will typically vary over a wide range.

As an alternative configuration, transistor $Q_1$ can be replaced transistors $Q_{23}$ through $Q_{25}$ and transistor $Q_3$ can be replaced with switches $S_7$ through $S_9$ and transistors $Q_{26}$ through $Q_{28}$. In this configuration, the aspect ratio (W/L ratio) of transistor $Q_1$ is generally variable in order to scale the output transistor $Q_1$ for different magnitudes of current $I_{SEL}$, which can be accomplished by using transistor $Q_{23}$ through $Q_{25}$. According to the selected target value $I_1$, $I_2$ or $I_3$, a corresponding output path through either transistor $Q_{23}$, $Q_{24}$, or $Q_{25}$ is selected by switching one of the switches $S_7$, $S_8$ or $S_9$ with digital control signal CNTL3.

The desired dimensions for the transistors $Q_{23}$ through $Q_{25}$ for different currents $I_{SEL}$ can be derived from the following considerations. The open loop gain was given by the following:

$$\text{Gain}(Adc) = gm1 \cdot R_1 \cdot gm2 \cdot R_2 \cdot GM0 \cdot RM0 \tag{1}$$

In equation (1) the terms $gm1 \cdot R_1$ and $gm2 \cdot R_2$ are independent from the magnitude of the selection current $I_{SEL}$ (i.e., GM0 and RM0 in equation (1) are dependent from the drain source current through the output transistor $Q_1$). Substitution of GM0 and RM0 by the simplified standard equations for MOSFETs in saturation provides the following result:

$$\text{Gain}(Adc) = gm1 \cdot R_1 \cdot gm2 \cdot R_2 \cdot \sqrt{2 \cdot I_{DS} \cdot \mu \cdot \text{Cox} \cdot \frac{W}{L}} \cdot \frac{1}{\lambda I_{DS}} \tag{2}$$

where $\lambda$, $\mu$, and Cox are technology parameters and IDS is the drain source current of the MOSFET transistor $Q_1$ having a gate width of W and a length of L. When the adjustable current $I_{ADJ}$ is varied, the current $I_{SEL}$ is also adapted or scaled and thereby the drain source current IDS through transistor $Q_1$. In order to take account of the changing current $I_{SEL}$ the scaling factor 1/k, can be introduced, such that:

$$I_{SEL} = \frac{1}{k} \cdot I_{DS} \tag{3}$$

$$\text{Gain}(Adc) = gm1 \cdot R_1 \cdot gm2 \cdot R_2 \cdot \sqrt{2 \cdot I_{SEL} \cdot \mu \cdot \text{Cox} \cdot \frac{W}{L}} \cdot \frac{1}{\lambda I_{SEL}} \tag{4}$$

However, the factor k in equation (4) can be compensated by reducing the width W of transistor $Q_1$ also by a factor of k, as could be seen from the following equation:

$$\text{Gain}(Adc) = gm1 \cdot R_1 \cdot gm2 \cdot R_2 \cdot \sqrt{2 \cdot \frac{I_{DS}}{k} \cdot \mu \cdot \text{Cox} \cdot \frac{W}{L \cdot k}} \cdot \frac{k}{\lambda I_{DS}} \tag{5}$$

$$= gm1 \cdot R_1 \cdot gm2 \cdot R_2 \cdot \sqrt{2 \cdot I_{DS} \cdot \mu \cdot \text{Cox} \cdot \frac{W}{L}} \cdot \frac{1}{\lambda I_{DS}}$$

Therefore, the gain can be made independent from the drain source current IDS, if the transistor is scaled accordingly.

The same scaling principle applies automatically with respect to the first pole of the open loop transfer, the frequency of which is fpa as indicated by following equation:

$$fpa = \frac{1}{2\pi \cdot R_2 \cdot C_3 \cdot GM0 \cdot RM0} \tag{6}$$

Since equation (6) contains also the factor GM0·RM0, fpa will remain unchanged as long as width W is reduced by the same factor k as the drain source current IDS through transistor $Q_1$.

Finally, the frequency of the second pole fpo is also unaffected from a scaled drain source current IDS through transistor $Q_1$ as could be seen from following equation:

$$fpo = \frac{GM0 \cdot C_3}{2\pi \cdot C_L \cdot C_2} \tag{7}$$

Equation (7) includes the factor GM0/$C_2$, where capacitance $C_2$ is the gate source capacitance of transistor $Q_1$. The gate source capacitance $C_2$ scales by factor k if the width W is reduced by k, as shown by the following equation:

$$\frac{GM0}{C_2} = \frac{\sqrt{2 \cdot \frac{I_{DS}}{k} \cdot \mu \cdot \text{Cox} \cdot \frac{W}{k \cdot L}}}{C_2/k} \tag{8}$$

$$= \frac{\sqrt{2 \cdot I_{DS} \cdot \mu \cdot \text{Cox} \cdot \frac{W}{L}}}{C_2}$$

An outcome of the above considerations is that it is possible to dimension the transistors $Q_{23}$ to $Q_{25}$ in order to compensate a changing drain source current (which is the selection current $I_{SEL}$) in the output transistors $Q_{23}$ to $Q_{25}$. It is possible to maintain gain and stability characteristics although the circuit is switched from one current to another. As an example, assuming that current $I_{ADJ}$ is set to a target value I2, current $I_{ADJ}$ can be changed from a target magnitude of I2 to I1 by activating or actuating switches $S_1$, $S_7$, and $S_4$ while deactivating or deactuating the other switches. Transistor $Q_{23}$ will be switched on and transistors $Q_{24}$ and $Q_{25}$ will be switched off. Although the magnitude of the selected current $I_{SEL}$ is changed, gain and stability of the control loop remain unaffected, since transistor $Q_{23}$ is scaled in accordance with the above equations.

Figure 3:
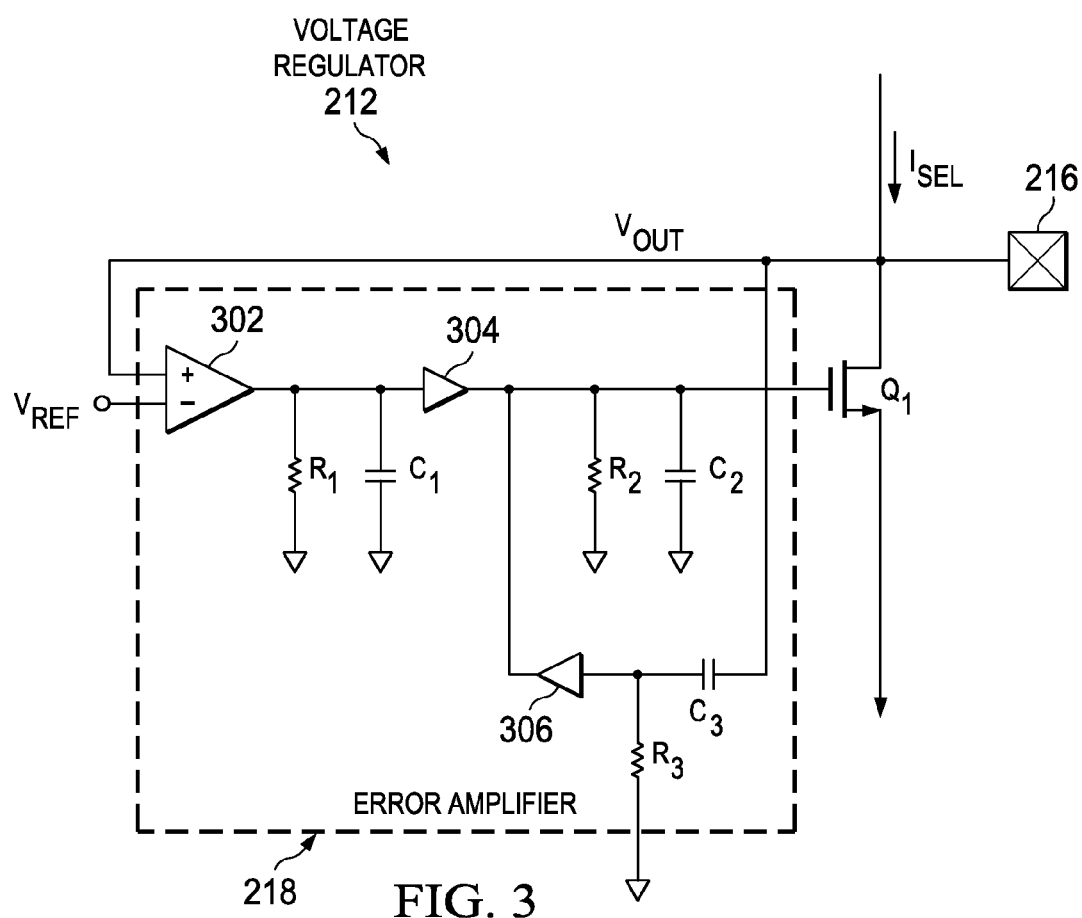
FIG. 3 is a simplified circuit diagram of the voltage regulator of FIG. 2 in accordance with a preferred embodiment of the present invention.
Figure 4:
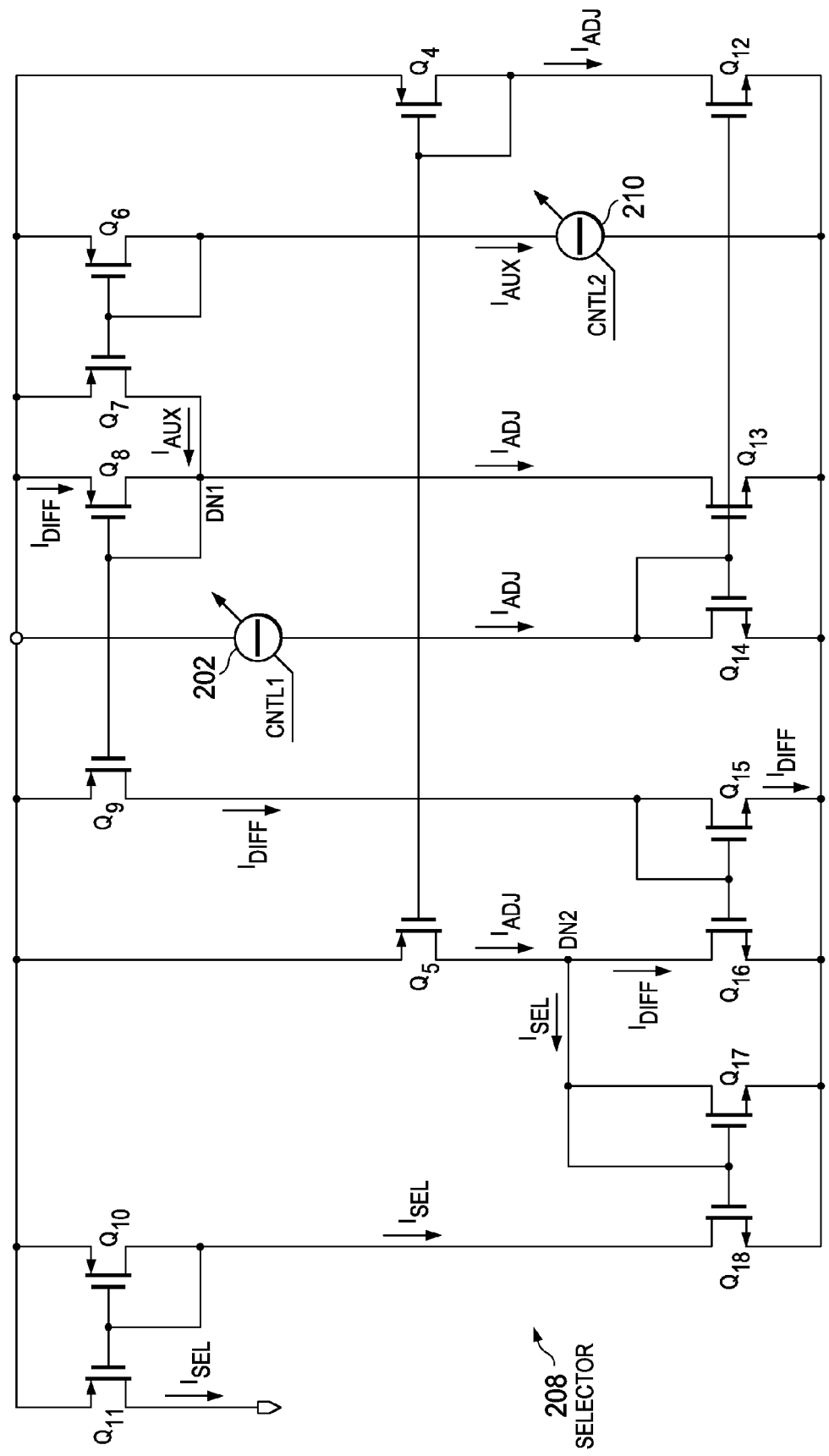
FIG. 4 is a simplified circuit diagram of the selector of FIG. 2 in accordance with a preferred embodiment of the present invention.
Figure 6:
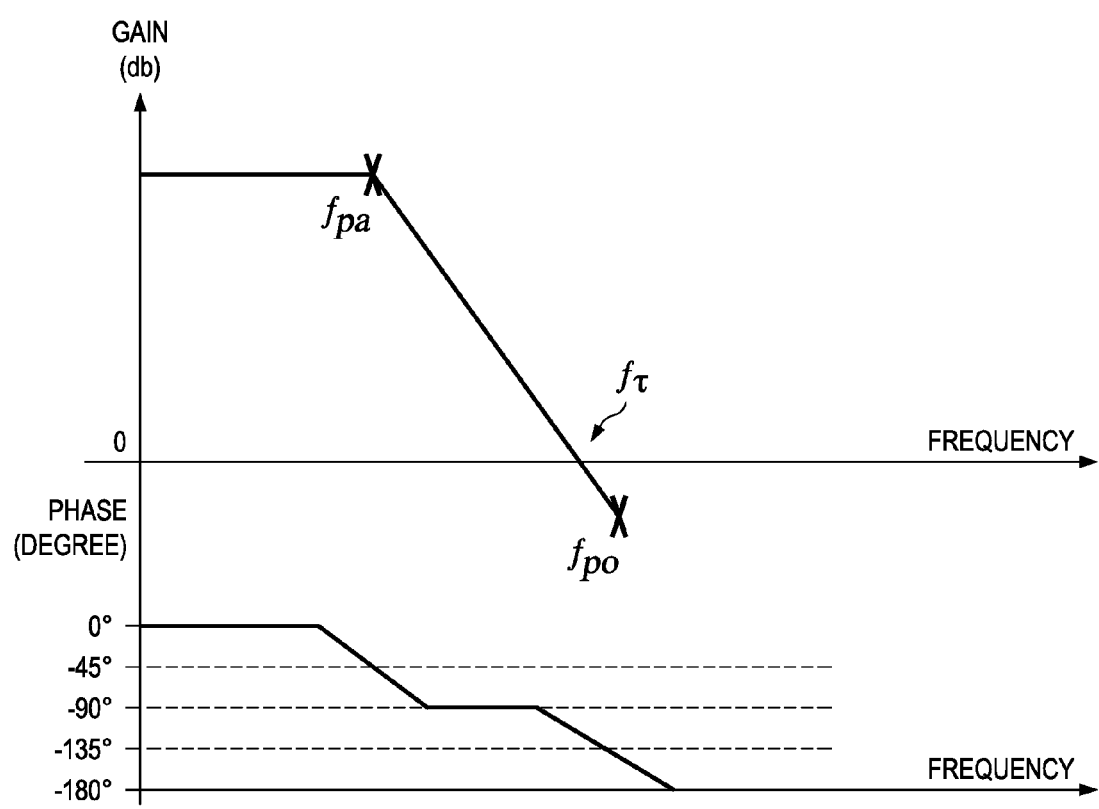
FIG. 6 is bode diagram depicting characteristics of the system of FIG. 2 in accordance with a preferred embodiment of the present invention.

Now turning to FIG. 6, an illustrative example of a Bode diagram in order to explain the Miller compensation as shown in FIG. 3. The stability analysis is based on the open loop. The loop is opened (disconnected) between the positive input of the error amplifier 212 and the node 216. The stability coefficients are given by equations (1), (6), and (7) above and by the following equations:

$$f\tau = \frac{gm1}{2\pi \cdot C_3} \qquad (9)$$

The parameter fpa relates to the frequency of the first pole (as discussed above) and fpo to the frequency of the second pole (as discussed above). The transit frequency fτ (or unity gain bandwith UGB) depends on the gain gm1 of the first stage and the value of the Miller compensation capacitance $C_2$.

Figure 7:
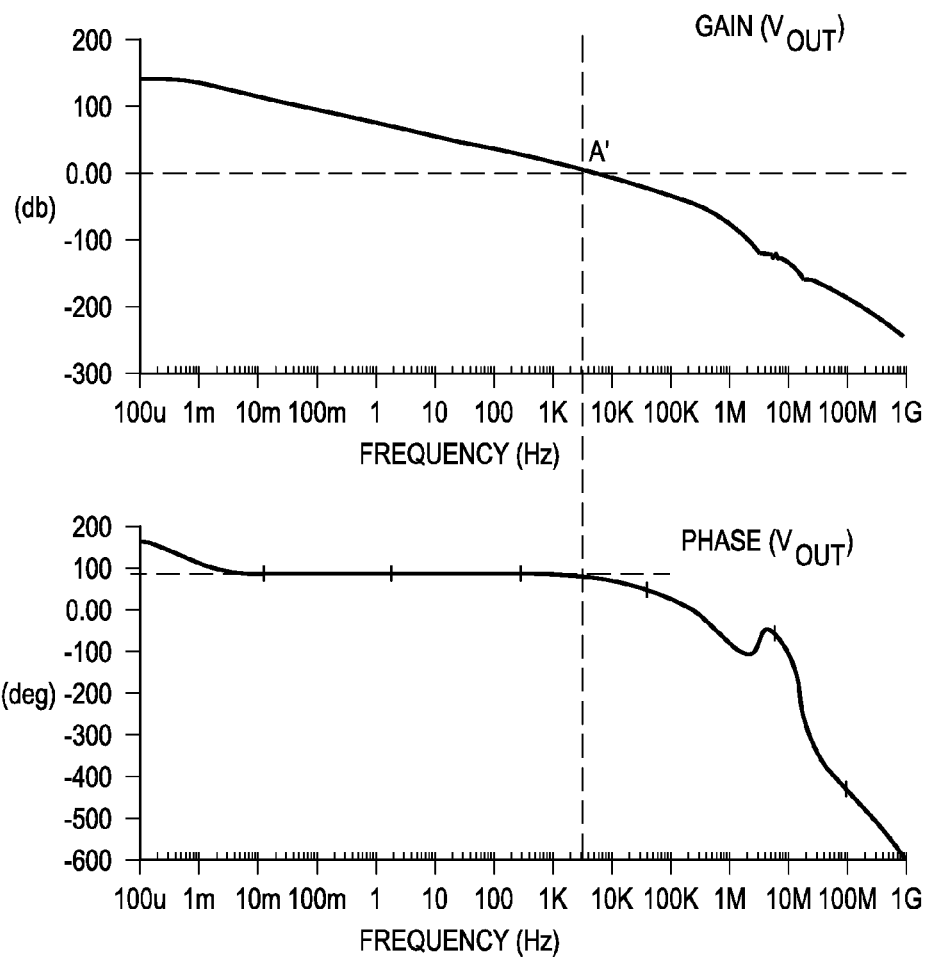
FIG. 7 shows a simulated bode diagram of the voltage regulator of FIG. 3.

Turning to FIG. 7, a simulated Bode diagram (AC response) of the voltage regulator 212 of FIG. 3 employed in circuit 200 is shown. In this example, current $I_{ADJ}$ is 20 mA, which is equal to the selection current $I_{SEL}$, and a load capacitor $C_L$ is 330 nF. As can be seen in FIG. 5, the phase margin at fτ is generally sufficient (i.e., greater than 40 degrees) because a target is to provide enough phase margin for a broad range of load capacitance values.

Figure 8:
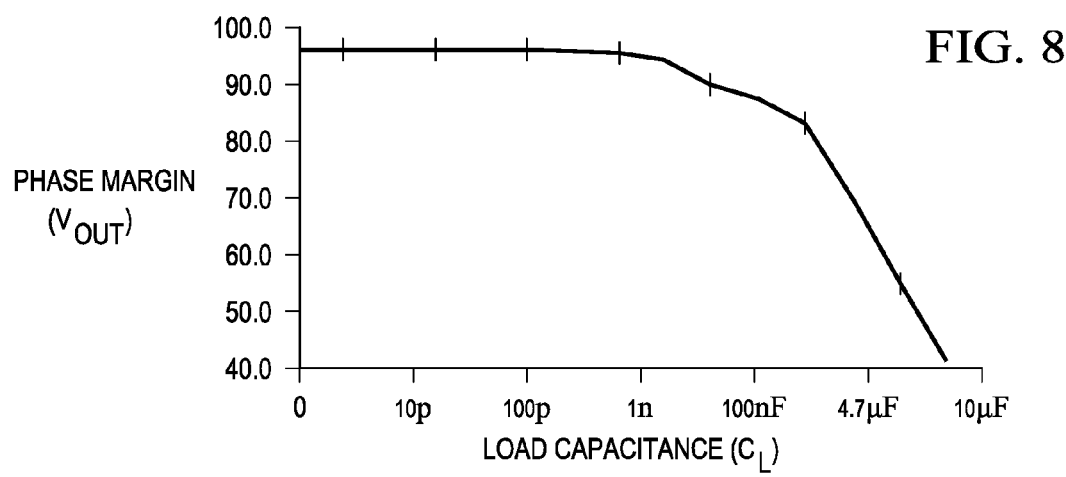
FIG. 8 shows the variation of the phase margin as a function of the load capacitance of voltage regulator of FIG. 3.

FIG. 8 shows the variation of the phase margin as a function of the value of load capacitance $C_L$. For the voltage regulator 212 of FIG. 3 having the parameters as set out above, the voltage regulator 212 generally provides sufficient phase margin for a load capacitance between zero and several tenths of μF.

Figure 9:
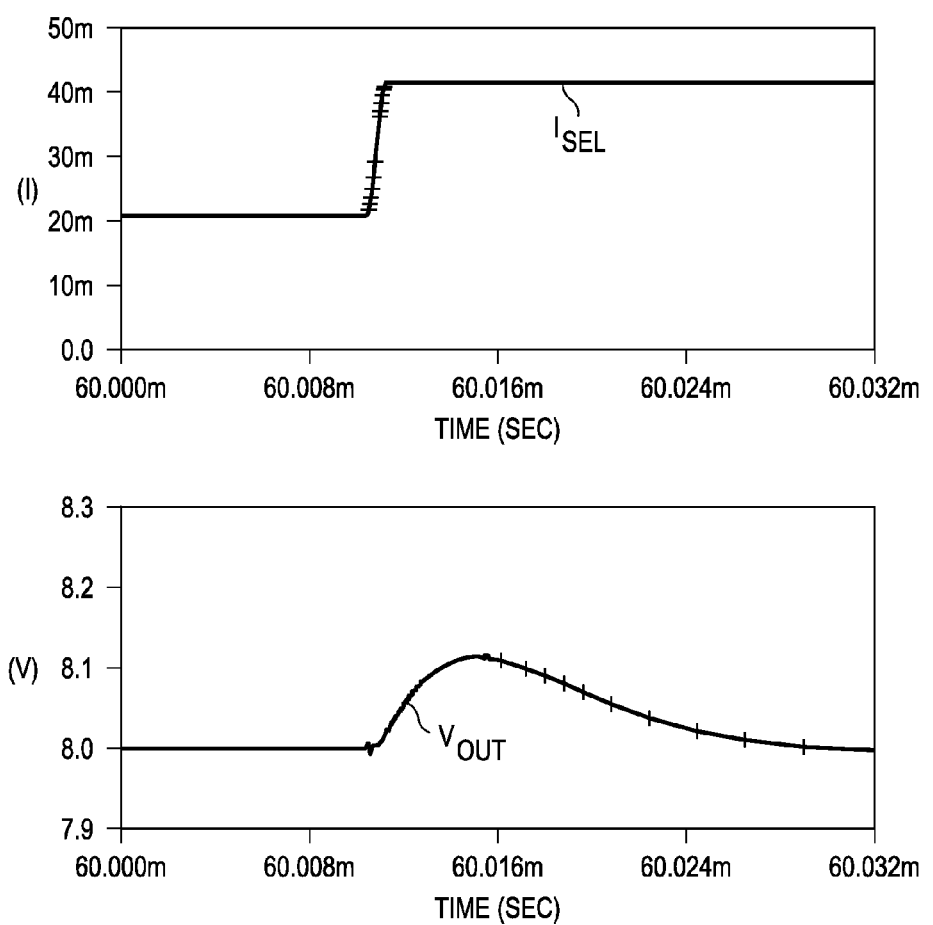
FIG. 9 shows waveforms relating to a transient simulation of the voltage regulator of FIG. 3.

FIG. 9 shows the transient behavior of the voltage regulator 212 of FIG. 3. If the current $I_{ADJ}$ is switched to a greater value (e.g., from about 20 mA to 40 mA), the selection current $I_{SEL}$ will also change. The output voltage $V_{OUT}$ has a slight overshoot of about 0.1V and settles quickly (within about 10 μs to 20 μs) to the target voltage level of 8 V.

Figure 10:
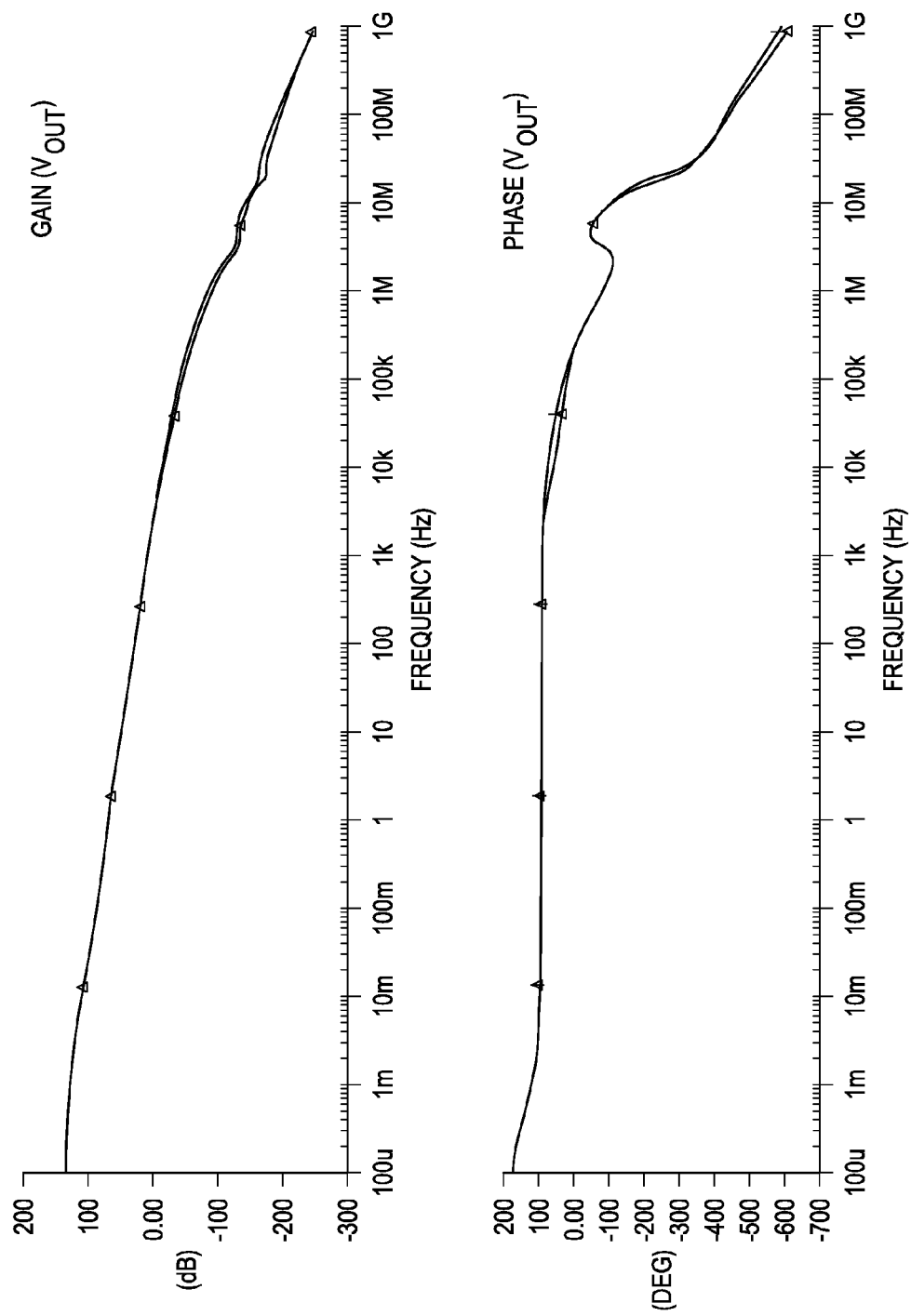
FIG. 10 shows a simulated bode diagram relating to the system of FIG. 5.

FIG. 10 shows a simulation of the circuit of FIG. 5. The bode diagrams shown relates to different target values of current $I_{ADJ}$ and therefore to different currents of the selection current $I_{SEL}$. However, the waveforms of magnitudes and phases of the open loop simulation are basically similar for different currents.

Figure 11:
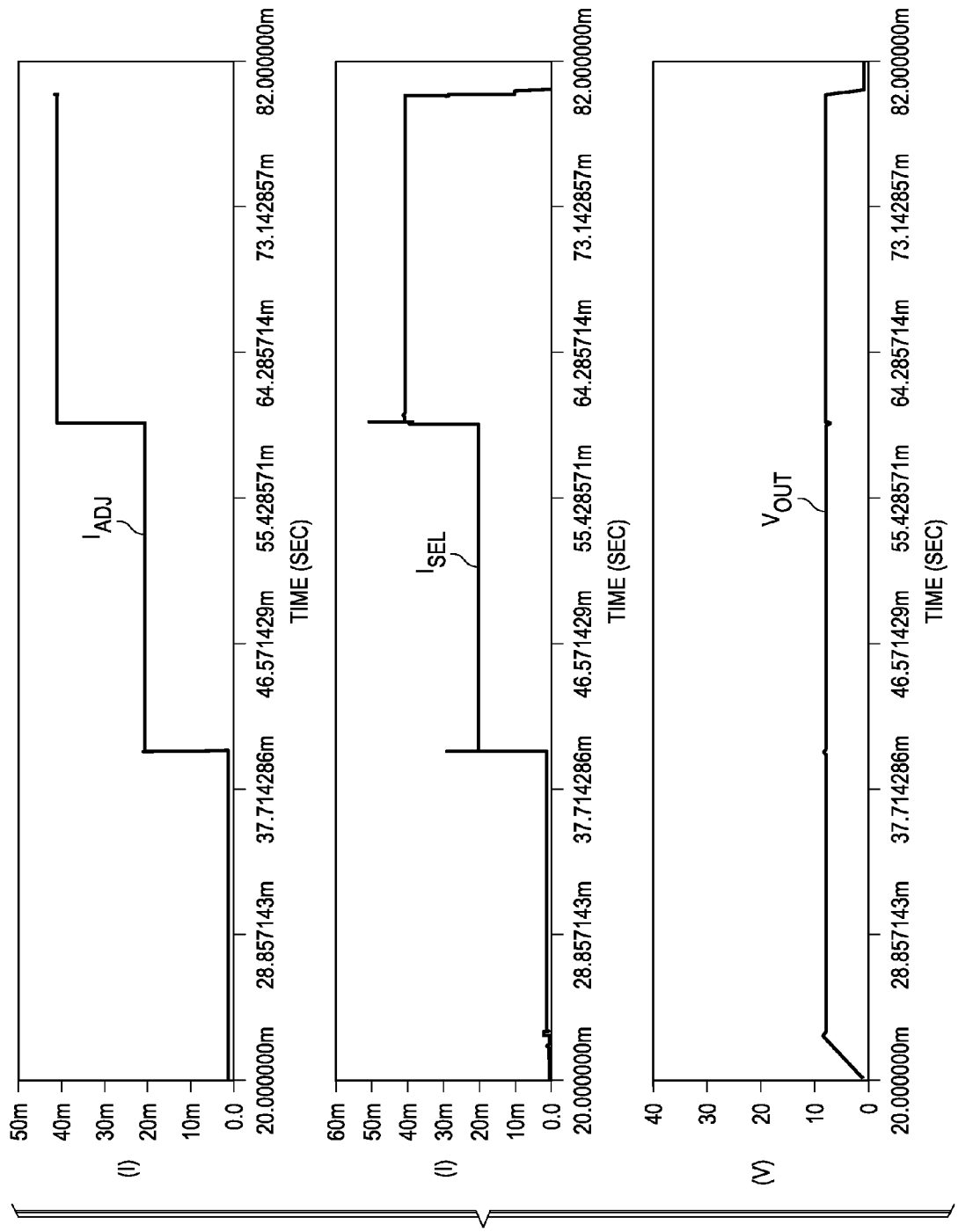
FIG. 11 shows waveforms relating to a transient simulation of system of FIG. 5.

FIG. 11 shows a corresponding transient response for a varying current $I_{ADJ}$ and a respective selection current $I_{SEL}$. The output voltage $V_{OUT}$ remains largely unchanged even though the magnitude of the current passed through the output transistors is substantially changed.

Figure 12:
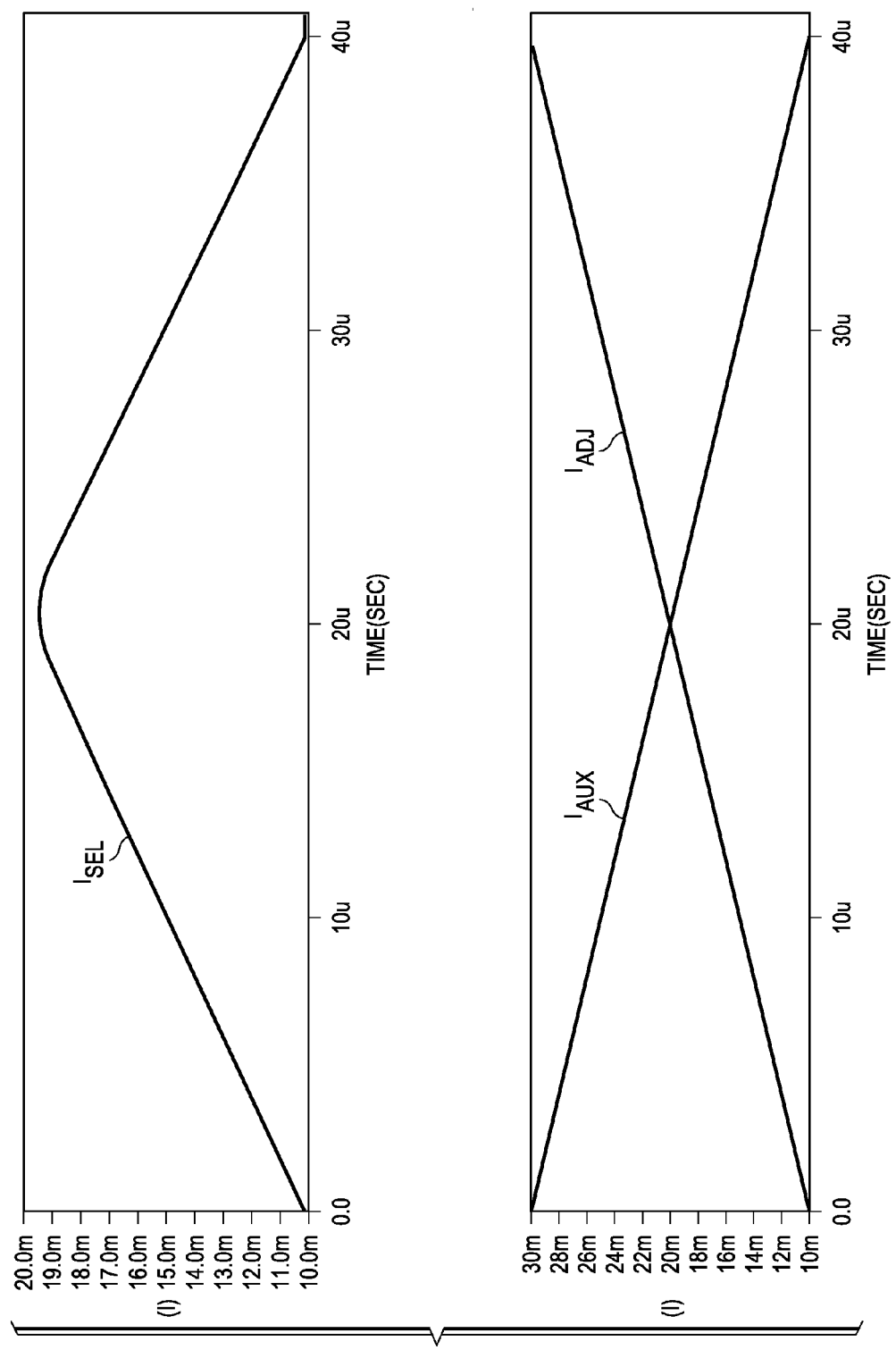
FIG. 12 shows waveforms of currents relating to the selector of FIG. 4.

FIG. 12 shows waveforms of the input currents $I_{ADJ}$ and $I_{AUX}$ and the output current $I_{SEL}$ selector 208. As shown, the selection current $I_{SEL}$ output from selector 208 is generally the lesser of the currents $I_{ADJ}$ and $I_{AUX}$.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. An apparatus comprising:
   a first pin that is adapted to be coupled to a load;
   a second pin that is adapted to be coupled to the load;
   a third pin;
   a first current source that is coupled to the first pin, wherein the first current source is adjustable, and wherein the first current source provides a first current to the first pin;
   a second current source that is adjustable and that provides a second current;
   a selector that is coupled to the second pin, the second current source, and the third pin, wherein the selector is adapted to receive the first current from the second pin and to receive the second current from the second current source, and wherein the selector outputs the lesser of the first and second currents to the third pin;
   a voltage regulator that is coupled to the third pin; and
   a current limiter that is coupled to the voltage regulator.

2. The apparatus of claim 1, wherein the voltage regulator further comprises:
   an error amplifier having a first input, a second input, and an output, wherein the first input is coupled to the third pin and the selector, and wherein the error amplifier receives a reference voltage at its second input; and
   a transistor that is coupled to the output of the error amplifier at its control electrode, the third pin at one of its passive electrodes, and the current limiter at one of its passive electrodes.

3. The apparatus of claim 2, wherein the error amplifier further comprises:
   a first amplifier that is coupled to the third pin and that receives the reference voltage;
   a second amplifier that is coupled between the first amplifier and the control electrode of the transistor; and
   a third amplifier that is coupled between the third pin and the control electrode of the transistor.

4. The apparatus of claim 2, wherein the transistor further comprises:
   a plurality of transistors, wherein each transistor is coupled to the output of the error amplifier at its control electrode and the third pin at one of its passive electrodes; and
   a plurality of switches, wherein each switch is coupled between at least one of the transistors and the current limiter, and wherein each electrode is actuated by a control signal.

5. The apparatus of claim 1, wherein the current limiter further comprises:
   a third current source that provides a reference current; and
   a first transistor that is diode connected and that is coupled to the third current source; and
   a second transistor that is coupled to the voltage regulator at one of its passive electrodes and that is coupled to the control electrode of the first transistor at its control electrode.

6. The apparatus of claim 5, wherein the second current source further comprises:
   a third transistor that is coupled to the control electrode of the first transistor at its control electrode;
   a first switch that is coupled to between a passive electrode of the third transistor and the selector, wherein the first switch is actuated by a control signal;
   a fourth transistor that is coupled to the control electrode of the first transistor at its control electrode;
   a second switch that is coupled to between a passive electrode of the fourth transistor and the selector, wherein the second switch is actuated by a control signal;

a fifth transistor that is coupled to the control electrode of the first transistor at its control electrode; and
a third switch that is coupled to between a passive electrode of the fifth transistor and the selector, wherein the third switch is actuated by a control signal.

7. The apparatus of claim 1, wherein the first current source further comprises:
a plurality of first current sources; and
a plurality of switches, wherein each switch is coupled between at least one of the first current sources and the first pin, and wherein each switch is actuated by a control signal.

8. The apparatus of claim 1, wherein the apparatus further comprises diagnostic circuitry that is coupled to the third pin.

9. An apparatus comprising:
a first pin that is adapted to be coupled to a load;
a second pin that is adapted to be coupled to the load;
a third pin;
an adjustable current source that provides a first current to the first pin, wherein the adjustable current source includes:
  a plurality of first current sources; and
  a plurality of first switches, wherein each switch is coupled between the first pin and at least one of the first current sources, and wherein each switch is actuated by a first control signal;
an auxiliary current source that provides a second current, wherein the auxiliary current source includes:
  a reference current source;
  a first transistor that is diode-connected and that is coupled to the reference current source at one of its passive electrodes;
  a plurality of second transistors, wherein each second transistor is coupled to the control electrode of the first transistor at its control electrode; and
  a plurality of second switches, wherein each second switch is coupled to a passive electrode of at least one of the second transistors, and wherein each second switch is actuated by a second control signal;
a selector that is coupled to the second pin, the auxiliary current source, and the third pin, wherein the selector is adapted to receive the first current from the second pin and to receive the second current from the auxiliary current source, and wherein the selector outputs the lesser of the first and second currents to the third pin;
a voltage regulator that is coupled to the second pin; and
a current limiter including:
  the reference current source;
  the first transistor;
  a plurality of third transistors, wherein each third transistor is coupled to the control electrode of the first transistor at its control electrode; and
  a plurality of third switches, wherein each third switch is coupled between a passive electrode of at least one of the third transistors and the voltage regulator, and wherein each third switch is actuated by a third control signal.

10. The apparatus of claim 9, wherein the voltage regulator further comprises:
an error amplifier having a first input, a second input, and an output, wherein the first input is coupled to the third pin and the selector, and wherein the error amplifier receives a reference voltage at its second input; and
a fourth transistor that is coupled to the output of the error amplifier at its control electrode, the third pin at one of its passive electrodes, and the current limiter at one of its passive electrodes.

11. The apparatus of claim 10, wherein the error amplifier further comprises:
a first amplifier that is coupled to the third pin and that receives the reference voltage;
a second amplifier that is coupled between the first amplifier and the control electrode of the fourth transistor; and
a third amplifier that is coupled between the third pin and the control electrode of the fourth transistor.

12. The apparatus of claim 10, wherein the transistor further comprises:
a plurality of transistors, wherein each transistor is coupled to the output of the error amplifier at its control electrode and the third pin at one of its passive electrodes; and
a plurality of switches, wherein each switch is coupled between at least one of the transistors and the current limiter, and wherein each electrode is actuated by a control signal.

13. The apparatus of claim 9, wherein the apparatus further comprises diagnostic circuitry that is coupled to the third pin.

14. An apparatus comprising:
a first pin that is adapted to be coupled to a load and that provides a first current;
a second pin;
a current source that is adjustable and that provides a second current;
a selector that is coupled to the first pin, the current source, and the second pin, wherein the selector outputs a selected current to the second pin, and wherein the selector includes:
  a first current difference node that provides a difference current, wherein the difference current is the first current minus the second current;
  a second current difference node that provides the selected current, wherein the selected current is the first current minus the difference current; and
  a current mirror that is coupled between the first difference node and the second difference node, wherein the current mirror supplies the difference current to the second difference node, and wherein the current mirror is configured such that the difference current output to the second difference node becomes substantially zero when the second current is greater than the first current;
a voltage regulator that is coupled to the second pin; and
a current limiter that is coupled to the voltage regulator.

15. The apparatus of claim 14, wherein the voltage regulator further comprises:
an error amplifier having a first input, a second input, and an output, wherein the first input is coupled to the second pin and the selector, and wherein the error amplifier receives a reference voltage at its second input; and
a transistor that is coupled to the output of the error amplifier at its control electrode, the third pin at one of its passive electrodes, and the current limiter at one of its passive electrodes.

16. The apparatus of claim 15, wherein the error amplifier further comprises:
a first amplifier that is coupled to the second pin and that receives the reference voltage;
a second amplifier that is coupled between the first amplifier and the control electrode of the transistor; and
a third amplifier that is coupled between the second pin and the control electrode of the transistor.

17. The apparatus of claim 15, wherein the transistor further comprises:
- a plurality of transistors, wherein each transistor is coupled to the output of the error amplifier at its control electrode and the second pin at one of its passive electrodes; and
- a plurality of switches, wherein each switch is coupled between at least one of the transistors and the current limiter, and wherein each electrode is actuated by a control signal.

18. The apparatus of claim 14, wherein the current limiter further comprises:
- a second current source that provides a reference current; and
- a first transistor that is diode connected and that is coupled to the second current source; and
- a second transistor that is coupled to the voltage regulator at one of its passive electrodes and that is coupled to the control electrode of the first transistor at its control electrode.

19. The apparatus of claim 18, wherein the current source further comprises:
- a third transistor that is coupled to the control electrode of the first transistor at its control electrode;
- a first switch that is coupled to between a passive electrode of the third transistor and the selector, wherein the first switch is actuated by a control signal;
- a fourth transistor that is coupled to the control electrode of the first transistor at its control electrode;
- a second switch that is coupled to between a passive electrode of the fourth transistor and the selector, wherein the second switch is actuated by a control signal;
- a fifth transistor that is coupled to the control electrode of the first transistor at its control electrode; and
- a third switch that is coupled to between a passive electrode of the fifth transistor and the selector, wherein the third switch is actuated by a control signal.

* * * * *